Patented Jan. 16, 1934

1,943,797

UNITED STATES PATENT OFFICE 1,943,797

PROCESS OF VULCANIZING RUBBER

Joseph R. Ingram, Nitro, W. Va., assignor to The Rubber Service Laboratories Company, Akron, Ohio, a corporation of Ohio No Drawing. Application March 23, 1931
Serial No. 524,770

7 Claims. (Cl. 18—53)

This invention relates to the vulcanization of rubber by an improved process, wherein there is employed a member of a preferred class of compounds which improve the action of the accelerator used in the vulcanization process. More specifically, the preferred class of compounds modify or retard the progress of vulcanization in the earlier stages of the curing process, but in the later stages they do not exert such retarding action and may even activate the vulcanization process. A compound possessing the property described is known as a retarder. The preferred mode of operating the present invention will be understood from the description and examples hereinafter set forth.

The preferred class of retarders employed in the manner hereinafter described comprises the aromatic ketones in which the carbonyl group is joined to an aliphatic or aromatic radical, and derivatives thereof.

As an example showing the use of the preferred class of compounds, a rubber mix was prepared in the well known manner comprising:

|  | Parts |
|---|---|
| Pale crepe rubber | 100 |
| Zinc oxide | 5 |
| Sulfur | 3 |
| The crotonaldehyde derivative of the reaction product of hexamethylenetetramine and mercaptobenzothiazole | 0.6 |
| Ortho-benzoyl-benzoic acid | 0.1 and/or 0.2 |

The mix was then vulcanized by heating under various pressures and for various periods of time. The cured stock was then tested to determine its modulus and tensile strength under various degrees of elongation. The results of the tests of the cured rubber product thus described are set forth in Table I.

Table I

| Time of cure | No. parts ortho-benzoyl-benzoic acid | Modulus of elasticity in lbs/in$^2$ at elongations of | | | Tensile lbs/in$^2$ at break | Ult. elong. percent |
|---|---|---|---|---|---|---|
| | | 300% | 500% | 700% | | |
| 20 mins. at 10# steam per sq. in. | None | 87 | 169 | 547 | 2185 | 980 |
| | 0.1 | 90 | 175 | 501 | 2110 | 980 |
| | 0.2 | 88 | 157 | 406 | 1935 | 1000 |
| 30 mins. at 10# steam per sq. in. | None | 97 | 257 | 1015 | 2675 | 890 |
| | 0.1 | 71 | 219 | 918 | 2720 | 895 |
| | 0.2 | 60 | 183 | 823 | 2400 | 900 |
| 15 mins. at 20# steam per sq. in. | None | 121 | 271 | 954 | 2795 | 915 |
| | 0.1 | 52 | 185 | 867 | 2735 | 930 |
| | 0.2 | 46 | 180 | 758 | 2530 | 940 |
| 30 mins. at 20# steam per sq. in. | None | 143 | 406 | 1615 | 3360 | 830 |
| | 0.1 | 94 | 332 | 1490 | 2985 | 815 |
| | 0.2 | 64 | 320 | 1355 | 2965 | 830 |
| 45 mins. at 20# steam per sq. in. | None | 177 | 543 | 2095 | 3530 | 800 |
| | 0.1 | 182 | 500 | 1950 | 3550 | 800 |
| | 0.2 | 142 | 467 | 1815 | 3545 | 825 |
| 1½ hrs. at 20# steam per sq. in. | None | 217 | 708 | 2545 | 3560 | 790 |
| | 0.1 | 190 | 611 | 2590 | 3525 | 780 |
| | 0.2 | 185 | 588 | 2330 | 3435 | 785 |
| 2 hrs. at 20# steam per sq. in. | None | 256 | 671 | 2405 | 4110 | 815 |
| | 0.1 | 273 | 681 | 2500 | 4190 | 810 |
| | 0.2 | 248 | 649 | 2450 | 4230 | 815 |

It is readily apparent from the above table that ortho-benzoyl-benzoic acid possesses particularly desirable retarding properties, as in the shorter timed and low pressure cures there is marked retarding of the vulcanization process in the presence of this compound, but in the longer times and higher steam pressure cures there is no retarding action, but in fact activation of acceleration.

In order to test the value of further examples of the preferred class of compounds as retarders, the following four rubber stocks, designated "A", "B", "C" and "D", were prepared and tested in the manner hereinbefore set forth.

Table II

|  | Stock A | Stock B | Stock C | Stock D |
|---|---|---|---|---|
|  | Parts | Parts | Parts | Parts |
| Pale crepe rubber | 100 | 100 | 100 | 100 |
| Zinc oxide | 5 | 5 | 5 | 5 |
| Sulfur | 3 | 3 | 3 | 3 |
| The acetaldehyde derivative of the reaction product of para-para-diamino-diphenyl-methane and mercaptobenzothiazole prepared according to the method set forth in the copending U.S. Patent application Serial No. 456,808 | 0.3 | 0.3 | 0.3 | 0.3 |
| Diphenylguanidine | 0.7 | 0.7 | 0.7 | 0.7 |
| Acetophenone | | 0.2 | | |
| Benzophenone | | | 0.1 | |
| Anthraquinone | | | | 0.1 |

The results of the modulus and tensile tests upon the above described rubber stocks after curing for various periods of time and under various steam pressures are given in Table III.

Table III

| Steam cure pressure | | Stock | Modulus of elasticity in lbs/in$^2$ at elongations of | | | Tensile lbs/in$^2$ at break | Ultimate elong. percent |
|---|---|---|---|---|---|---|---|
| Mins. | In lbs/in$^2$ | | 300% | 500% | 700% | | |
| 15 | 10 | A | 121 | 226 | 705 | 2020 | 915 |
| 15 | 10 | B | 91 | 166 | 545 | 1810 | 940 |
| 15 | 10 | C | 82 | 168 | 500 | 1765 | 940 |
| 15 | 10 | D | 136 | 212 | 531 | 1915 | 980 |
| 20 | 10 | A | 113 | 236 | 847 | 2855 | 945 |
| 20 | 10 | B | 124 | 229 | 787 | 2340 | 910 |
| 20 | 10 | C | 109 | 213 | 697 | 2485 | 960 |
| 20 | 10 | D | 101 | 205 | 665 | 2355 | 950 |
| 30 | 10 | A | 132 | 340 | 1240 | 3490 | 910 |
| 30 | 10 | B | 135 | 331 | 1155 | 2740 | 870 |
| 30 | 10 | C | 129 | 302 | 1070 | 3085 | 915 |
| 30 | 10 | D | 144 | 284 | 998 | 2855 | 910 |
| 60 | 20 | A | 232 | 867 | 3530 | 4890 | 780 |
| 60 | 20 | B | 249 | 789 | 3025 | 4170 | 760 |
| 60 | 20 | C | 284 | 885 | 3460 | 5085 | 785 |
| 60 | 20 | D | 275 | 877 | 3475 | 4700 | 770 |
| 90 | 20 | A | 310 | 1080 | 4050 | 5225 | 760 |
| 90 | 20 | B | 295 | 970 | 3690 | 4575 | 740 |
| 90 | 20 | C | 323 | 1025 | 4085 | 4970 | 745 |
| 90 | 20 | D | 313 | 1035 | 4060 | 4865 | 740 |

A comparison of the results given in Table III shows that the preferred class of retarders, as for example acetophenone, benzophenone and anthraquinone, show marked retarding effect on the cure in the shorter timed and lower steam pressure cures. This is a highly desirable property, as scorching or prevulcanizing on the mixing rolls is thereby substantially prevented. Moreover, the danger of pile curing of sheeted uncured rubber stock containing a semi-ultra accelerator is materially decreased by the use of the retarders set forth herein, while the reworking of uncured scrap stock is rendered more readily possible.

The results hereinbefore set forth show that a vulcanized rubber product of particularly high quality is obtained by employing the preferred substances in a rubber stock of vulcanizing characteristics, while disadvantageous effects during the handling and milling of the stocks are avoided.

Other aromatic ketones than those hereinbefore set forth may be employed in the manner described. Thus, ortho-tolylphenyl ketone, para-ditolyl ketone, para-xylo-quinone, alpha-naphthoquinone, and analogous compounds may be employed in the vulcanization of rubber in a manner analogous to that hereinbefore set forth.

This invention is not restricted to the use of the particular compounds given in the disclosure as examples, nor is it restricted to the use of the preferred class of compounds in the particular rubber mixes herein described. The invention is limited only by the claims attached hereto as part of the present specification.

What is claimed is:

1. The process of retarding the vulcanization of rubber which comprises heating a mixture of rubber, sulfur, and an accelerator in the presence of a carboxyl substituted aromatic ketone.

2. The process of retarding the vulcanization of rubber which comprises heating a mixture of rubber, sulfur, and an accelerator in the presence of a benzoyl-benzoic acid.

3. The process of retarding the vulcanization of rubber which comprises heating a mixture of rubber, sulfur, and an accelerator in the presence of ortho-benzoyl-benzoic acid.

4. The process of retarding the vulcanization of rubber which comprises heating a mixture of rubber, sulfur and an accelerator in the presence of an aromatic mono ketone, the hydrogen atoms of which are replaceable only by alkyl hydrocarbon substituents and groups consisting of carbon, oxygen and hydrogen atoms.

5. The process of retarding the vulcanization of rubber which comprises heating a mixture of rubber, sulfur and an accelerator in the presence of an aromatic mono ketone containing at least one phenyl group joined to a carbonyl group, the hydrogen atoms of said ketone being replaceable only by alkyl hydrocarbon substituents and groups consisting of carbon, hydrogen and oxygen atoms.

6. The process of retarding the vulcanization of rubber which comprises heating a mixture of rubber, sulfur and an accelerator in the presence of an aromatic mono ketone possessing the structure of

where R represents an aromatic radical, the hydrogen atoms of which are replaceable only by alkyl hydrocarbon groups and groups consisting of carbon, hydrogen and oxygen atoms.

7. The process of retarding the vulcanization of rubber which comprises heating a mixture of rubber, sulfur and an accelerator in the presence of a member of a group consisting of ortho-benzoyl benzoic acid, acetophenone and benzophenone.

JOSEPH R. INGRAM.